Patented Aug. 6, 1935

2,010,754

UNITED STATES PATENT OFFICE 2,010,754

SULPHONATED SULPHONES AND THEIR PRODUCTION

Friedrich Felix and Otto Albrecht, Basel, Switzerland, assignors to Society of Chemical Industry in Basle, Basel, Switzerland No Drawing. Application July 7, 1933, Serial No. 679,450. In Switzerland July 15, 1932

14 Claims. (Cl. 260—106)

This invention relates to the manufacture of valuable textile adjuvants by converting into sulphuric acid derivatives soluble in water, such as sulphonic acids or sulphuric acid esters, sulphones of the general formula

$$R_1-SO_2-R_2$$

wherein $R_1$ is an aromatic, aliphatic, aliphatic-aromatic or cyclo-aliphatic residue and $R_2$ is an aliphatic or cyclo-aliphatic residue containing, if desired, any substituent, and wherein at least one of the residues $R_1$ and $R_2$ is an aliphatic or cyclo-aliphatic residue of high molecular weight.

Such a sulphone may be converted into a sulphuric acid derivative of the kind in question by introducing into it a true sulpho-group or a sulpho-group combined in ester-fashion, or by so selecting the reacting compounds for a reaction between a sulphinic acid and an organic halogen compound for obtaining a sulphone of the aforesaid general formula that the sulphone produced contains at least one true sulpho-group or sulpho-group combined in ester-fashion.

Sulphones suitable as parent materials for the invention are, for instance, those which can be obtained from an alkali salt of a sulphinic acid of the benzene, toluene or α- or β-naphthalene series on the one hand and chlorotetradecane, cetyl iodide, lauryl chloride, lauryl bromide, myristyl iodide, octadecyl-chloride, -bromide or -iodide, or a halogenated paraffin on the other hand. There may also be used sulphones which may be made by starting from an aliphatic, aliphatic-aromatic or hydro-aromatic sulphinic acid, such as ethanesulphinic acid, benzylsulphinic acid or camphenesulphinic acid-(2). A suitable parent material is a sulphone which is obtainable by reaction of an α-halogen fatty acid of high molecular weight or a derivative thereof, for instance α-bromolauric acid ethyl ester, α-bromostearic acid ethyl ester, 2-bromodocosanoic acid-(1)-ethyl ester, α-bromocerotinic acid ethyl ester, α-bromomelissic acid ethyl ester, or other esters thereof, such as methyl esters, propyl esters or butyl esters, or α:β-dibromostearic acid, or the like, with a salt of a sulphinic acid, for instance a toluenesulphinic acid, if desired in the presence of a solvent or under pressure. For obtaining easily soluble sulphones containing hydroxy-groups a phenolcarboxylate can be converted into a sulphinic acid and then the alkali metal salt of this phenol-carboxylate-sulphinic acid, or the alkali metal salt of the hydroxy-sulphinic acid obtained by saponification, is caused to react with an organic halogen compound to form a sulphone.

For conversion into the derivatives soluble in water the sulphone may be treated with a sulphonating agent, for instance concentrated sulphuric acid, sulphuric acid-monohydrate, sulphur trioxide, sulphuric acid containing sulphur trioxide, sulphuric acid-halohydrin, or with a mixture of any of these, whereby according to the conditions of the reaction and the choice of parent materials a true sulphonic acid or sulphuric acid ester, or a mixture of both, is produced. The reaction may occur in presence of a solvent or diluent, such as acetic acid or a substance which withdraws water, such as acetic anhydride or phosphorus pentoxide. Should the sulphone contain halogen capable of exchange, a water-soluble derivative may be made by treating it with a sulphite.

Water-soluble derivatives of sulphones may also be made by causing a salt of a sulphinic-sulphonic acid, for instance an alkali metal salt of a naphthalene-sulphinic acid-(1)-sulphonic acid-(4), to react with an organic halogen compound, for instance with cetyl chloride or α-bromo-lauric acid ethyl ester.

The sulphuric acid derivatives of sulphones made according to this invention may have, when the parent materials have been suitably chosen, valuable capillary active properties, which render them useful as wetting agents, washing agents, dispersing agents or the like for the manifold purposes of the textile, leather and allied industries. They may be used alone or together with solvents, protective colloids, soaps or soapy materials.

In a general manner the new water-soluble sulphones form in a dry state solid, colorless to slightly colored substances. They dissolve in water with formation of strongly foaming solutions.

The following examples illustrate the invention, the parts being by weight:—

Example 1

In an autoclave provided with a stirrer 12.5 parts of sodium para-toluenesulphinate and 16.1 parts of a mixture of aliphatic chlorides of high molecular weight, known in the trade as "Lorylchloride" and consisting chiefly of lauryl chloride, and about 150 parts by volume of ethyl alcohol are heated together for about 24 hours to 150–160° C. The solid product thus obtained is separated from the liquor and washed, first with some alcohol and then with water. For further purification it may be recrystallized from dilute alcohol, whereby it is obtained in the form of colorless felted needles.

For sulphonating this product 3 parts of it are introduced at about 5–10° C., while cooling, into 12 parts of fuming sulphuric acid containing 24 per cent. of SO₃. The temperature is allowed to rise to 30° C. and then lowered and kept at room temperature until a sample of the mass dissolves in water. The sulphonation product is then transferred to ice and salted out with potassium chloride. After filtration and drying, there is obtained a grey powder, the aqueous solution of which forms strongly when shaken and has a surprising wetting effect and a good washing effect, particularly in hard water. In the form of its sodium salt the new sulphone probably consists principally of a product of the formula

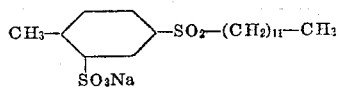

For washing wool containing sweat there is used a solution which contains per liter 2 grams of the sulphonated product. The wool which has been washed in the course of half-an-hour at 45° C. is pure white.

For the preliminary wetting of cotton yarn or wool yarn in aqueous liquids, there may be added per liter of the liquor 1 gram of the sulphonated product. Wool yarn which, as is known, can be wetted only with difficulty, sinks at the ordinary temperature very quickly in such a liquor.

*Example 2*

27.4 parts of α-bromostearic acid ethyl ester, 14.9 parts of sodium toluenesulphinate and about 100 parts of ethyl alcohol are together kept for about 8 hours at 150–160° C. in an autoclave having a stirrer. The sodium toluenesulphinate used need not be pure. It is even possible to use the corresponding quantity of a product containing salt. For separating the sulphone produced the mixture is diluted with water and shaken with a solvent immiscible with water, such as benzene. The benzene extract is distilled to remove the benzene, whereby the sulphone is obtained in the form of a bright reddish-yellow oil which solidifies on cooling. For the sulphonation 5 parts of this sulphone are run into 10 parts of chlorosulphonic acid while cooling and there are then added gradually 10 parts of fuming sulphuric acid of 64 per cent. strength, the temperature being kept below about 10°. The temperature is now allowed to rise to 30° C. and stirring at room temperature is continued until the product is soluble in water. If at the end of the sulphonation the mixture is transferred to a little ice, the sulphonic acid produced may be separated, if the cooling is sufficient, from the dilute sulphuric acid. After neutralizing and drying there is obtained a yellowish powder which has a good washing effect. As sodium salt the new sulphone has probably the following constitution:—

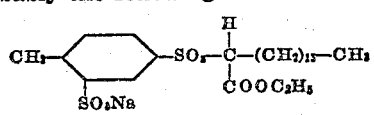

*Example 3*

25 parts of α-bromolauric acid ethyl ester, a quantity of sodium toluenesulphinate corresponding with 17.4 parts of the pure sulphinate and 90 parts by volume of ethyl alcohol are heated together 150–160°C. for about 11 hours in an autoclave having a stirrer. The mixture is then diluted with water and the whole is extracted with a solvent, for instance ether. After distilling the solvent from the extract, the sulphone remains in the form of a yellowish oil.

For the sulphonation of this product, 15 parts of it are run, while cooling, into 30 parts of chlorosulphonic acid and there are then added gradually 30 parts of fuming sulphuric acid containing about 64 per cent. of sulphur trioxide, the temperature being kept below about 10° C. The temperature is then allowed to rise to 30° C. and stirring at room temperature is continued until the product is soluble in water. The working up of the product is as described in Example 2. There is obtained a powder which exhibits a good washing effect.

What we claim is:—

1. Process for the manufacture of valuable textile adjuvants, consisting in converting a sulphone of the general formula

wherein R₁ is a radical selected from a group consisting of the aromatic, aliphatic, benzyl and terpene radicals, and R₂ is a radical selected from a group consisting of the aliphatic and terpene radicals, and wherein at least one of the two radicals R₁ and R₂ is an aliphatic or terpene radical of high molecular weight, into a sulphuric acid derivative soluble in water by treatment with a sulphonating agent.

2. Process for the manufacture of valuable textile adjuvants, consisting in converting a sulphone of the general formula

wherein R₁ is an aromatic radical, and R₂ an aliphatic carbon chain consisting of at least 8 carbon atoms, into a sulphuric acid derivative soluble in water by treatment with a sulphonating agent.

3. Process for the manufacture of valuable textile adjuvants, consisting in converting a sulphone of the general formula

wherein R₁ is an aromatic radical, and R₂ an aliphatic radical consisting of a normal carbon chain of at least 8 carbon atoms, into a sulphuric acid derivative soluble in water by treatment with a sulphonating agent.

4. Process for the manufacture of valuable textile adjuvants, consisting in converting a sulphone of the general formula

wherein R₁ is an aromatic radical, and R₂ an aliphatic radical consisting of a normal carbon chain which is linked by the terminal carbon atom to the SO₂-group, into a sulphuric acid derivative soluble in water by treatment with a sulphonating agent.

5. Process for the manufacture of valuable textile adjuvants, consisting in converting a sulphone of the general formula

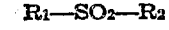

wherein R₁ is an aromatic radical, and R₂ an aliphatic radical consisting of a normal carbon chain which is linked by the penultimate carbon atom to the SO₂-group, into a sulphuric acid derivative soluble in water by treatment with a sulphonating agent.

6. Process for the manufacture of a valuable textile adjuvant, consisting in converting the sulphone of the formula

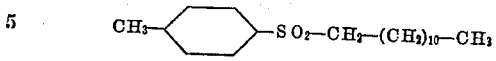

into the sulphuric acid derivative soluble in water by treatment with a sulphonating agent.

7. Process for the manufacture of valuable textile adjuvants, consisting in converting a sulphone of the general formula

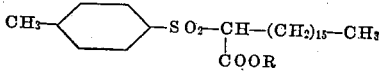

wherein R stands for an alkyl group, into a sulphuric acid derivative soluble in water by treatment with a sulphonating agent.

8. The water-soluble sulphones of the general formula

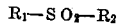

wherein $R_1$ is a radical selected from a group consisting of the aromatic, aliphatic, benzyl and terpene radicals, and $R_2$ is a radical selected from a group consisting of an aliphatic and terpene radicals, and wherein at least one of the two radicals $R_1$ and $R_2$ is an aliphatic or terpene radical of high molecular weight, which sulphones contain at least one $SO_3H$-group, and which in the form of their dried alkali metal salts constitute solid, colorless to lightly colored substances which dissolve in water with formation of strongly foaming solutions.

9. The water-soluble sulphones of the general formula

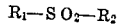

wherein $R_1$ is an aromatic radical, and $R_2$ an aliphatic radical consisting of a carbon chain of at last 8 carbon atoms, and wherein the aromatic radical carries at least one $SO_3H$-group, which sulphones in the form of their dried alkali metal salts constitute solid, colorless to lightly colored substances which dissolve in water with formation of strongly foaming solutions.

10. The water-soluble sulphones of the general formula

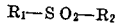

wherein $R_1$ is an aromatic radical, and $R_2$ an aliphatic radical consisting of a normal carbon chain of at least 8 carbon atoms, and wherein the aromatic radical carries at least one $SO_3H$-group, which sulphones in the form of their dried alkali metal salts constitute solid, colorless to lightly colored substances which dissolve in water with formation of strongly foaming solutions.

11. The water-soluble sulphones of the general formula

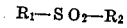

wherein $R_1$ is an aromatic radical, and $R_2$ an aliphatic radical consisting of a normal carbon chain which is linked by the terminal carbon atom to the $SO_2$-group, and wherein the aromatic radical carries at least one $SO_3H$-group, which sulphones in the form of their dried alkali metal salts constitute solid, colorless to lightly colored substances which dissolve in water with formation of strongly foaming solutions.

12. The water-soluble sulphones of the general formula

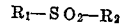

wherein $R_1$ is an aromatic radical, and $R_2$ an aliphatic radical consisting of a normal carbon chain which is linked by the penultimate carbon atom to the $SO_2$-group, and wherein the aromatic radical carries at least one $SO_3H$-group, which sulphones in the form of their dried alkali metal salts constitute solid, colorless to lightly colored substances which dissolve in water with formation of strongly foaming solutions.

13. The water-soluble sulphone of the formula

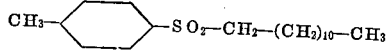

wherein the benzene nucleus carries at least one sulphonic group, which sulphone in the form of its dried alkali metal salts constitutes a solid, colorless to lightly colored substance which dissolves in water with formation of a strongly foaming solution.

14. The water-soluble sulphones of the general formula

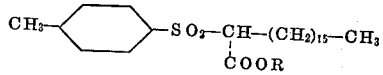

wherein the benzene nucleus carries at least one sulphonic group and wherein R stands for alkyl, which sulphones in the form of their dried alkali metal salts constitute solid, colorless to lightly colored substances which dissolve in water with formation of strongly foaming solutions.

FRIEDRICH FELIX.
OTTO ALBRECHT.